US012237095B2

(12) United States Patent
Fugane et al.

(10) Patent No.: US 12,237,095 B2
(45) Date of Patent: Feb. 25, 2025

(54) CONDUCTOR AND MANUFACTURING METHOD OF THE SAME

(71) Applicant: DENSO CORPORATION, Kariya (JP)

(72) Inventors: Keisuke Fugane, Kariya (JP); Yoshinobu Suzuki, Kariya (JP); Takumi Okamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 35 days.

(21) Appl. No.: 18/068,563

(22) Filed: Dec. 20, 2022

(65) Prior Publication Data

US 2023/0120391 A1 Apr. 20, 2023

Related U.S. Application Data

(63) Continuation of application No. PCT/JP2021/020415, filed on May 28, 2021.

(30) Foreign Application Priority Data

Jun. 30, 2020 (JP) ................................ 2020-113133

(51) Int. Cl.
*H01B 1/04* (2006.01)
*H01B 13/32* (2006.01)

(52) U.S. Cl.
CPC ............ *H01B 1/04* (2013.01); *H01B 13/322* (2013.01)

(58) Field of Classification Search
CPC .......... H01B 1/00; H01B 1/04; C01B 32/158; C01B 32/182
See application file for complete search history.

(56) References Cited

U.S. PATENT DOCUMENTS 8,981,357 B2 * 3/2015 Yoon .................. H01L 29/1606 257/40
9,663,369 B2 * 5/2017 Afzali-Ardakani .......................... C01B 32/168
2013/0153831 A1 6/2013 Afzali-Ardakani et al.
2023/0271838 A1 * 8/2023 Ding .................... G01N 27/308 423/447.1

FOREIGN PATENT DOCUMENTS

DE 102012222023 A1 6/2013
JP 2015210955 A 11/2015

OTHER PUBLICATIONS

Gosh et al "Rate and Mechanistic Investigation of Eu(OTf)2-Mediated Reduction of Graphene Oxide at Room Temperature", dx.doi.org/10.1021/jp501994k | J. Phys. Chem. B 2014, 118, 5524-5531.*
Sobhani et al "Immobilized Lanthanum(III) Triflate on Graphene Oxide as a New Multifunctional Heterogeneous Catalyst for the One-Pot Five-Component Synthesis of Bis(pyrazolyl)methanes" ACS Sustainable Chem. Eng. 2017, 5, 4598-4606.*
Soo Min Kim, Ki Kang Kim, Young Woo Jo, Min Ho Park, Seung Jin Chae, Dinh Loc Duong, Cheol Woong Yang, Jing Kong, and Young Hee Lee, "Role of Anions in the AuCl3-Dopingof Carbon Nanotubes", ACS Nano vol. 5, No. 2, p. 1236-p. 1242, 2011.

* cited by examiner

*Primary Examiner* — Mark Kopec
(74) *Attorney, Agent, or Firm* — Harness, Dickey & Pierce, P.L.C.

(57) ABSTRACT

A conductor includes a conductive structure and a dopant. The conductive structure has a predetermined shape and includes a carbon material having conductivity. The dopant causes the carbon material to generate an electric charge. The dopant includes a trifluoromethanesulfonate that is composed of a trivalent ion of a lanthanide and triflate anions.

8 Claims, 7 Drawing Sheets

CONDUCTOR AND MANUFACTURING METHOD OF THE SAME

CROSS REFERENCE TO RELATED APPLICATIONS

The present application is a continuation application of International Patent Application No. PCT/JP2021/020415 filed on May 28, 2021, which designated the U.S. and claims the benefit of priority from Japanese Patent Application No. 2020-113133 filed on Jun. 30, 2020. The entire disclosures of all of the above applications are incorporated herein by reference.

TECHNICAL FIELD

The present disclosure relates to a conductor and a manufacturing method of the conductor.

BACKGROUND

There has been known a conductive film in which chloroauric acid as a dopant is brought into contact with a surface of a carbon nanotube (CNT)-containing film that is a film containing CNT. In this conductive film, the dopant reduces a sheet resistance of the CNT-containing film and improves conductivity. The sheet resistance is also called a surface resistivity.

SUMMARY

The present disclosure provides a conductor and a manufacturing method of the conductor. The conductor includes a conductive structure and a dopant. The conductive structure has a predetermined shape and includes a carbon material having conductivity. The dopant causes the carbon material to generate an electric charge. The dopant includes a trifluoromethanesulfonate that is composed of a trivalent ion of a lanthanide and triflate anions.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
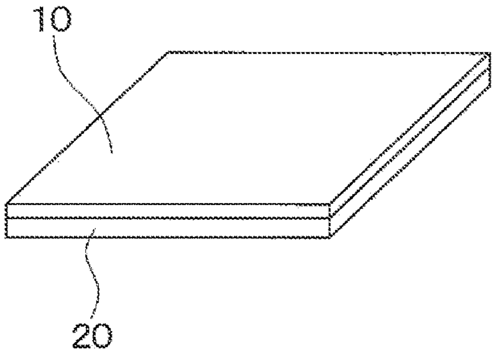
FIG. 1 is a perspective view of a transparent conductive film according to an embodiment.

The present inventors have found that a conductive film in which chloroauric acid as a dopant is brought into contact with a surface of a CNT-containing film deteriorates in performance in a high-temperature and high-humidity environment and loses its effect of improving conductivity. Note that this is not limited to the conductive film containing the CNT-containing film and chloroauric acid. It is conceivable that the performance deteriorates in a high-temperature and high-humidity environment in a conductive structure containing a carbon material and a conductor containing chloroauric acid.

According to one aspect of the present disclosure, a conductor includes a conductive structure having a predetermined shape and including a carbon material having conductivity, and a dopant that causes the carbon material to generate an electric charge. The dopant includes a trifluoromethanesulfonate that is composed of a trivalent ion of a lanthanide and triflate anions.

According to this configuration, the conductivity of the conductive structure can be improved by the dopant, and deterioration of performance in a high-temperature and high-humidity environment can be restricted.

According to another aspect of the present disclosure, a manufacturing method of a conductor includes: preparing a conductive structure having a predetermined shape and including a carbon material having conductivity; preparing a solution including a solute and a solvent, the solute serving as a dopant that causes the carbon material to generate an electric charge; attaching the solution to the conductive structure; and removing the solvent from the conductive structure after attaching the solution to the conductive structure. The preparing of the solution includes preparing the solute including a trifluoromethanesulfonate that is composed of a trivalent ion of a lanthanide and triflate anions.

According to this manufacturing method, the conductivity of the conductive structure can be improved by the dopant, and deterioration of performance in a high-temperature and high-humidity environment can be restricted.

Hereinafter, an embodiment of the present disclosure will be described. A conductor of the present embodiment includes a conductive structure containing a conductive carbon material and a dopant that causes the carbon material to generate electric charges.

As the conductive carbon material, a nanocarbon material is used. The nanocarbon material is a carbon material whose structure is controlled at a nano-size level. The nano-size is a size of 1000 nm or less, including 1 nm or less. The nanocarbon material includes a carbon material whose smallest dimension among its own dimensions is in a range from 1 nm to 1000 nm inclusive. Examples of the nanocarbon material include CNT, carbon nanobud (CNB), graphene, and the like. CNT, CNB, graphene, and the like mainly have a six-membered ring structure. As the conductive carbon material, a carbon material having conductivity other than the nanocarbon material may also be used.

The conductive structure is an object having conductivity and having a predetermined shape. An example of the conductive structure is a transparent conductive film 10 shown in FIG. 10. The transparent conductive film 10 is formed by dispersing a carbon material (for example, CNT) into a film shape. The transparent conductive film 10 has desired visible light transmittance and desired conductivity.

The transparent conductive film 10 is supported by a substrate 20 that is transparent. As the substrate 20, a substrate made of a synthetic resin material (for example, PET and the like) or an inorganic material (for example, quartz glass and the like) is used. Note that the transparent conductive film 10 does not have to be supported by the substrate 20.

The transparent conductive film 10 is used as a transparent heater. The transparent heater is used as a heater for securing the function of an in-vehicle sensor or a windshield of a vehicle. The transparent heater heats the sensor or the windshield when icing, fogging and or like occurs on the sensor or the windshield. Accordingly, the icing, the fogging, or the like is eliminated.

The conductive structure may be an opaque conductive film. The shape of the conductive structure may also be a wire shape instead of the film shape.

The dopant is interspersed with respect to the conductive structure. The dopant is a substance that increases charges present in the carbon material. In the present embodiment, the dopant is a positive charge imparting dopant (that is, p-type dopant) that imparts positive charges to the carbon material.

Figure 2:
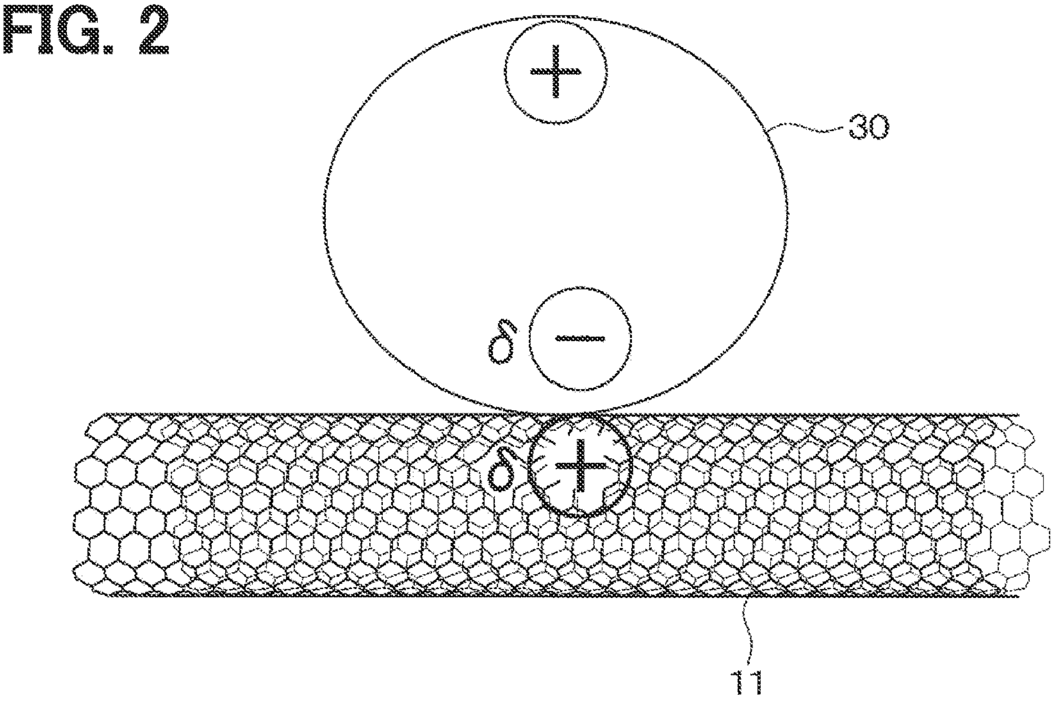
FIG. 2 is a schematic diagram of a CNT and a dopant according to the embodiment.

FIG. 2 shows a CNT 11 as an example of the carbon material and a dopant 30. As shown in FIG. 2, the dopant 30 is in contact with a surface of the CNT 11. In this way, the dopant is in contact with the carbon material while being present outside the carbon material. The dopant may also be in contact with the carbon material while being present inside the carbon material.

In the present embodiment, the dopant includes a trifluoromethane-sulfonate composed of a trivalent ion of a lanthanide and triflate anions. The dopant may include other compounds as long as the dopant mainly includes trifluoromethanesulfonate. Lanthanides are elements with atomic numbers from 57 to 71. Lanthanides include cerium (Ce). The chemical formula of the triflate anion is $CF_3SO_3^-$.

Figure 3:
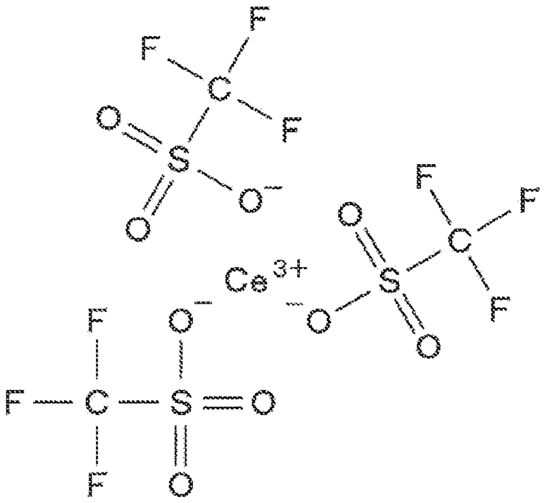
FIG. 3 is a diagram showing a chemical structure of a trifluoromethane-sulfonate composed of a trivalent ion of cerium and triflate anions and containing no water molecules.

FIG. 3 is a diagram showing a chemical structure of a trifluoromethane-sulfonate composed of a trivalent ion of cerium and triflate anions and containing no water molecules. This trifluoromethanesulfonate is represented as anhydrous Ce(III) triflate, anhydrous Ce(III)$CF_3SO_3$, or anhydrous Ce(III)TfO.

Figure 4:
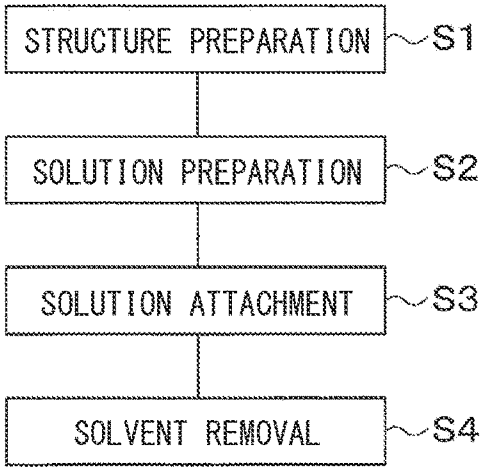
FIG. 4 is a flow chart showing a manufacturing method of the conductor according to the embodiment.

Next, a manufacturing method of the conductor having the above-described structure will be described. As shown in FIG. 4, the manufacturing method of the conductor includes a structure preparation process S1, a solution preparation process S2, a solution attachment process S3, and a solvent removal process S4.

In the structure preparation process S1, the conductive structure including the conductive carbon material is prepared.

In the solution preparation process S2, a solution containing a solute that serves as the dopant and a solvent is prepared. In the solution, the solute is dissolved in the solvent. As the solute, a solute that includes a trifluoromethanesulfonate composed of a trivalent ion of a lanthanide and triflate anions is used. As the solvent, an organic solvent such as isopropyl alcohol, ethanol, THF, hexane, dichloroethane, diethylene glycol diethyl ether, acetone, NMP, or ethyl acetate is used. The concentration of the solution prepared at this time may be any concentration that allows the dopant to come into contact with the carbon material.

Either the structure preparation process S1 or the solution preparation process S2 may be performed first, or they may be performed at the same time.

After the structure preparation process S1 and the solution preparation process S2 are performed, the solution attachment process S3 is performed. In the solution attachment process S3, the solution is attached to the conductive structure.

As a method of attaching the solution, a method of applying the solution, a method of spraying the solution, a method of immersing the conductive structure in the solution, or the like can be employed. In a case where a membrane is used as the conductive structure, the solution is attached to a surface of the membrane. Alternatively, the solution may be attached inside the membrane by penetrating inside the membrane.

After the solution is attached in the solution attachment process S3, the solvent removal process S4 is performed. In the solvent removal process S4, the conductive structure attached with the solution is dried. At this time, the conductive structure is heated to a temperature equal to or higher than a boiling point of the solvent. Accordingly, the solvent in the solution is removed from the conductive structure to which the solution is attached. The conductor is manufactured as described above.

Figure 5:
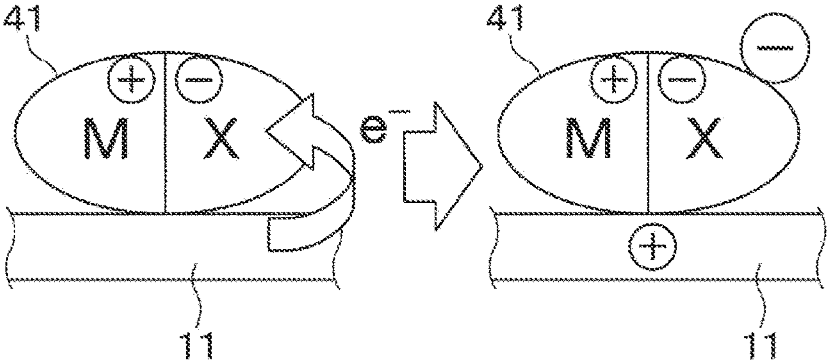
FIG. 5 is a schematic diagram of a positively charged dopant and a CNT according to a comparative example.
Figure 6:
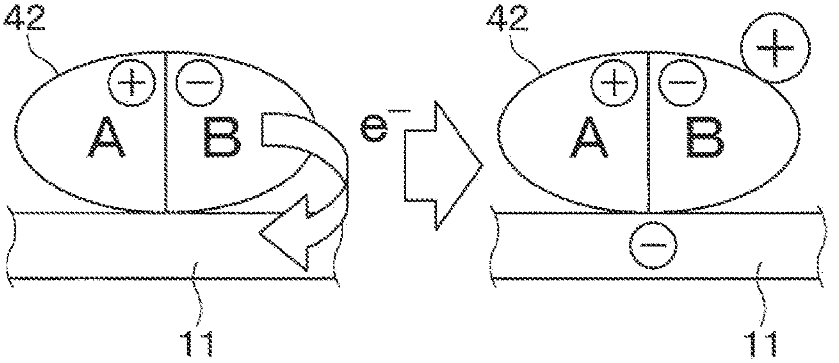
FIG. 6 is a schematic diagram of a negatively charged dopant and a CNT according to another comparative example.

Here, dopants according to comparative examples will be described. FIG. 5 and FIG. 6 show the CNT 11 as the carbon material, a positively charged dopant 41, and a negatively charged dopant 42. As shown in FIG. 5, the positively charged dopant 41 receives an electron from the CNT 11. Accordingly, a positive charge is imparted to the CNT 11.

As shown in FIG. 6, the negatively charged dopant 42 transfers an electron to the CNT 11. Accordingly, a negative charge is imparted to the CNT 11. In this way, the dopants 41 and 42 impart charges to the carbon material by transferring electrons to and from the carbon material. At this time, surplus charges are generated in the dopants 41 and 42.

As will be described later in Examples, a conductor using chloroauric acid, which is a dopant that imparts a positive charge, has an effect of improving conductivity due to the dopant. However, the present inventors found that when the conductor is exposed to a high-temperature and high-humidity environment, the performance of the conductor deteriorates and the effect of improving the conductivity disappears. It is considered that the reason why the performance of the conductor deteriorated is that the water reacted with the chloroauric acid in which surplus electric charges are present in the high-temperature and high-humidity environment.

In contrast, the dopant of the present embodiment includes the trifluoromethanesulfonate composed of the trivalent ion of the lanthanide and the triflate anions. As shown in FIG. 2, the dopant is polarized and has a strong degree of polarization. Therefore, an electric charge is generated in the carbon material due to an electrostatic attraction force between the polarized dopant and the carbon material. The carbon material at this time is in a polarized state. Thus, the dopant of the present embodiment electrostatically imparts electric charges to the carbon material by polarization of the dopant without transfer of electric charges (that is, electrons) to the carbon material. Therefore, the dopant restricts the generation of surplus electric charges.

Therefore, according to the conductor of the present embodiment, since the electric charge is generated in the carbon material by the dopant, the conductivity of the conductive structure is improved. Furthermore, since the generation of surplus electric charges is restricted, it is possible to restrict deterioration of the performance of the conductor in a high-temperature and high-humidity environment, and to maintain the effect of improving conductivity.

The lanthanide of the dopant described above is preferably cerium as described in the examples described below. The trifluoromethanesulfonate composed of the trivalent ion of cerium and the triflate anions has a strong dopant polarization and a high electron-attracting property, and is therefore considered to be capable of generating charges in the carbon material.

However, the electron density of an element that becomes a cation can be cited as a factor of the high electron-attracting property of the dopant. Similar to Ce, a trifluoromethanesulfonate of an element in which electrons are arranged in f-orbitals and d-orbitals is considered to have a high electron-attracting property. Thus, trifluoromethanesulfonates of lanthanides other than Ce, which have similar electronic states to Ce, also have high electron-attracting properties, and are considered to have the same effect as Ce.

The present disclosure is not limited to the foregoing description of the embodiment and can be modified. The present disclosure may also be varied in many ways. Such variations are not to be regarded as departure from the disclosure, and all such modifications are intended to be included within the scope of the disclosure. Individual components or features of the above-described embodiment are not necessarily essential unless it is specifically stated that the components or the features are essential in the foregoing description, or unless the components or the features are obviously essential in principle.

The numerical value such as the number, the numerical value, the quantity, the range, or the like of components mentioned in the above-described embodiment is not limited to a specific number unless specified as being required, clearly limited to such a specific number in principle, or the like. The material, the shape, the positional relationship, and the like of a component or the like mentioned in the above embodiment are not limited to those being mentioned unless otherwise specified, or limited to specific material, shape, positional relationship, and the like in principle.

Example 1

<Dopant Treatment>

Figure 7:
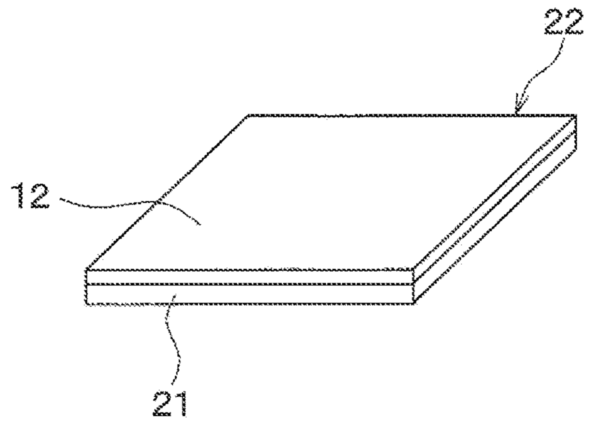
FIG. 7 is a perspective view of a specimen of Example 1 before a solution is attached.

As shown in FIG. 7, the present inventors prepared a specimen 22 in which a CNT film 12 containing CNTs was formed on a quartz substrate 21. The CNT film 12 is a film formed by dispersing CNTs. The diameter of the CNTs used is in the range of 0.7 to 3 nm.

The present inventors performed a dopant treatment on the prepared specimen 22. For the dopant treatment, a solution in which anhydrous Ce(III) triflate as a solute is dissolved in IPA (that is, isopropyl alcohol) as a solvent was prepared. The IPA used is 19516 IPA manufactured by Sigma-Aldrich Co. LLC. The anhydrous Ce(III) triflate used is Ce triflate abcr GmbH, PubChem SID: 316470470, Purchasable Chemical: AB255546. The concentration of the prepared solution is 10 mM.

Figure 8:
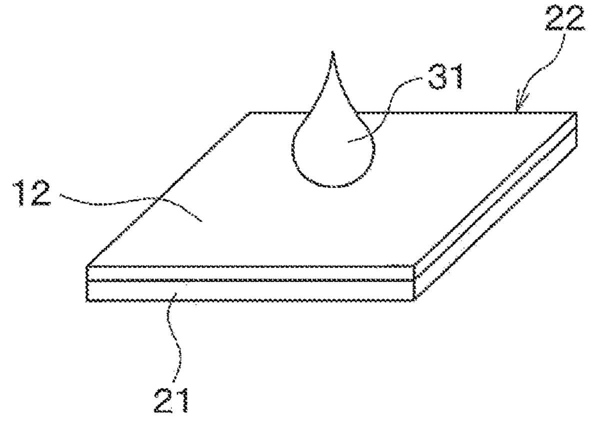
FIG. 8 is a perspective view of the specimen of Example 1 in a state where the solution is attached.

Then, the present inventors dropped the prepared solution onto the surface of the CNT film 12 with a pipette. As a result, a droplet 31 of the solution was attached to the surface of the CNT film 12, as shown in FIG. 8. At this time, the present inventors applied 300 μl of the solution to the specimen having a size of 2 cm×2 cm. The present inventors held the state for 30 seconds. After that, the present inventors removed the solution on the surface of the specimen 22 with an air blow. Furthermore, the present inventors dried the specimen 22 to remove the solvent. The drying conditions are 100° C. for 10 minutes in the air.

<Evaluation of Conductivity Improvement>

The present inventors measured the sheet resistance of the CNT film 12 before the dopant treatment and the CNT film 12 after the dopant treatment using an eddy current type sheet resistance measuring instrument. The unit of sheet resistance is Ω square. Then, the present inventors calculated the sheet resistance change rate with respect to the sheet resistance before the dopant treatment using the sheet resistance value before the dopant treatment, the sheet resistance value after the dopant treatment, and the following equation.

$$\text{Sheet resistance change rate } (\%) = (Rs2 - Rs1)/Rs1 \times 100$$

In this equation, Rs1 is the sheet resistance value before the dopant treatment. Rs2 is the sheet resistance value after the dopant treatment.

<Durability Evaluation Test>

The present inventors held the specimen after the dopant treatment for 1000 hours inside a thermo-hygrostat maintained in a high-temperature and high-humidity environment. The setting of the thermo-hygrostat is 85° C. and RH 85%. The present inventors measured the sheet resistance of the CNT film using the eddy current type sheet resistance measuring instrument every elapsed time. Then, the present inventors calculated the sheet resistance change rate with respect to the sheet resistance before the dopant treatment in the same manner as described above.

Comparative Example 1

The present inventor performed a dopant treatment in the same manner as in Example 1 using $AuCl_4H \cdot 3H_2O$ (that is, chloroauric acid) as a solute. The chloroauric acid used is Tetrachloroauric (III) acid trihydrate 99.5% for analysis EMSURE (R), CAS 16961-25-4, EC 240-948-4, chemical formula $AuCl_4H \cdot 3H_2O$ manufactured by Sigma-Aldrich Co. LLC. The concentration of the solution used is 20 mM.

The present inventors measured the sheet resistance before and after the dopant treatment in the same manner as in Example 1. The sheet resistance change rate was calculated from the results. Furthermore, the present inventors conducted the durability evaluation test in the same manner as in Example 1. The present inventors measured the sheet resistance of the CNT film at each elapsed time. The present inventors calculated the sheet resistance change rate from these results.

In addition, the present inventors analyzed the chemical state of the dopant before and after the durability evaluation test using X-ray photoelectron spectroscopy. "After the durability evaluation test" means after holding for 1000 hours in the thermo-hygrostat.

Figure 9:
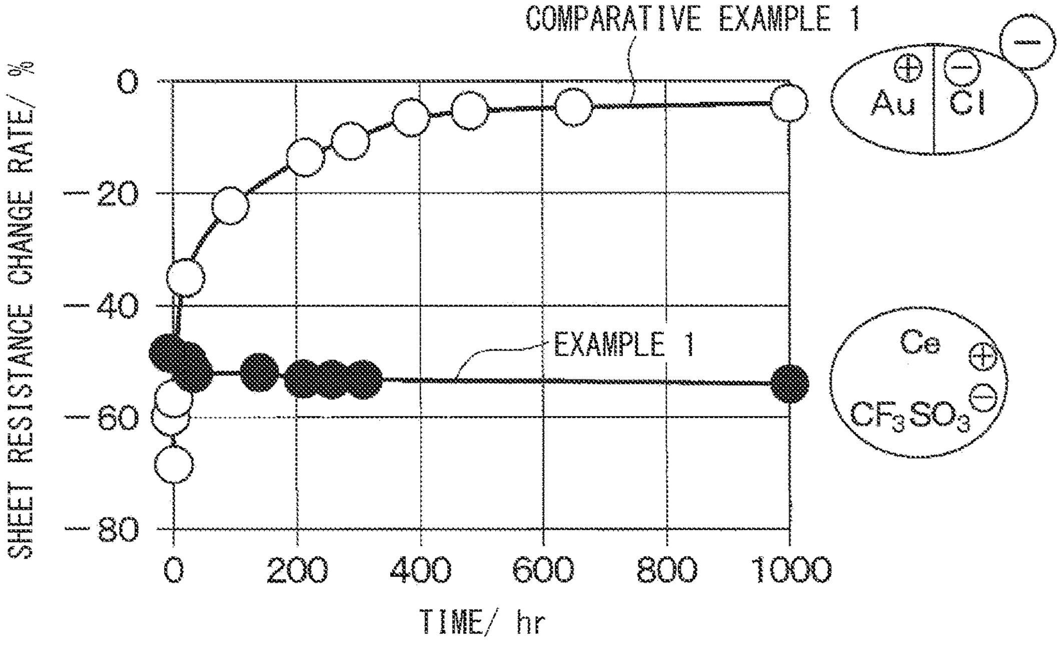
FIG. 9 is a graph showing results of durability evaluation tests of Example 1 and Comparative Example 1.

FIG. 9 shows the results of the durability evaluation tests for Example 1 and Comparative Example 1. The vertical axis of the graph in FIG. 9 indicates the sheet resistance change rate with respect to the sheet resistance before the dopant treatment. The horizontal axis of the graph in FIG. 9 indicates the time of exposure to the high-temperature and high-humidity environment. The sheet resistance change rate at time 0 is the sheet resistance change rate after the dopant treatment.

As shown in FIG. 9, in Example 1, the sheet resistance change rate after the dopant treatment is less than −40%. A negative value of the sheet resistance change rate means that the sheet resistance decreased compared to the sheet resistance before the dopant treatment. The absolute value of the sheet resistance change rate is greater than 40%. From this result, it can be seen that in Example 1, the reduction rate of the sheet resistance is large, and the effect of improving the conductivity is high. The sheet resistance change rate is nearly constant even after the time of exposure to the high-temperature and high-humidity environment has passed. Thus, in Example 1, it was confirmed that the performance did not deteriorate in the high-temperature and high-humidity environment.

As shown in FIG. 9, in Comparative Example 1, the sheet resistance change rate after the dopant treatment is a negative value and the absolute value is large, as in Example 1. Thus, the effect of improving conductivity is high. However, in Comparative Example 1, the sheet resistance change rate increased with the passage of time exposed to the high-temperature and high-humidity environment. After 1000 hours, the sheet resistance change rate was close to 0%. Thus, in Comparative Example 1, it was confirmed that the performance deteriorated in the high-temperature and high-humidity environment, and the effect of improving conductivity disappeared.

Figure 10:
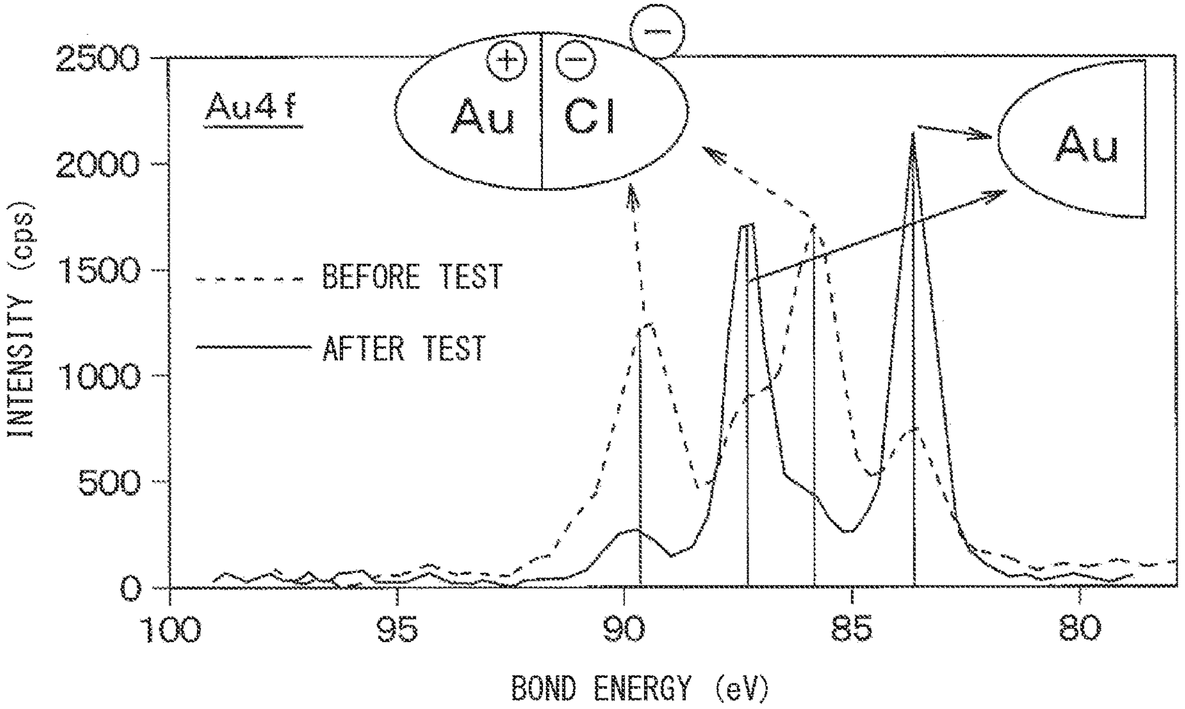
FIG. 10 is a diagram showing results of chemical state analysis of a dopant of Comparative Example 1 before and after the durability evaluation test.

FIG. 10 shows results of chemical state analysis of the dopant before and after the durability evaluation test of Comparative Example 1. As shown in FIG. 10, it was confirmed that chloroauric acid decreased and gold increased after the test compared to before the test. That is, a change from $Au^+$ to Au was confirmed. This is because $AuCl_4^-$ was hydrolyzed to produce hydrochloric acid and hypochlorous acid. From the results of FIG. 10, it is considered that in Comparative Example 1, since chloroauric acid was reduced from an ionized product to gold in the high-temperature and high-humidity environment, the charges of the CNTs are reduced and the performance of the CNT film deteriorates.

It was confirmed that the performance of a specimen using chloroauric acid as a dopant, as Comparative Example 1, deteriorates in a high temperature environment of 120° C. and the effect of improving conductivity disappears. On the other hand, it was confirmed that the performance of a specimen using anhydrous Ce(III) triflate, as in Example 1, did not deteriorate in a high temperature environment of 120° C.

Example 2

In Example 2, the present inventors used the same anhydrous Ce(III) triflate as in Example 1 as the solute. Using a specimen different from that of Example 1, the present inventors performed a dopant treatment, sheet resistance measurements before and after the dopant treatment, and sheet resistance measurements at each elapsed time in the durability evaluation test in the same manner as in Example 1. Then, the present inventors calculated the sheet resistance change rate with respect to the sheet resistance before the dopant treatment. However, in Example 2, the specimen was held inside the thermo-hygrostat for 216 hours.

In addition, the present inventors analyzed the chemical state of the dopant before and after the durability evaluation test using X-ray photoelectron spectroscopy. "After the durability evaluation test" means after holding for 216 hours in the thermo-hygrostat.

Comparative Example 2

Figure 11:
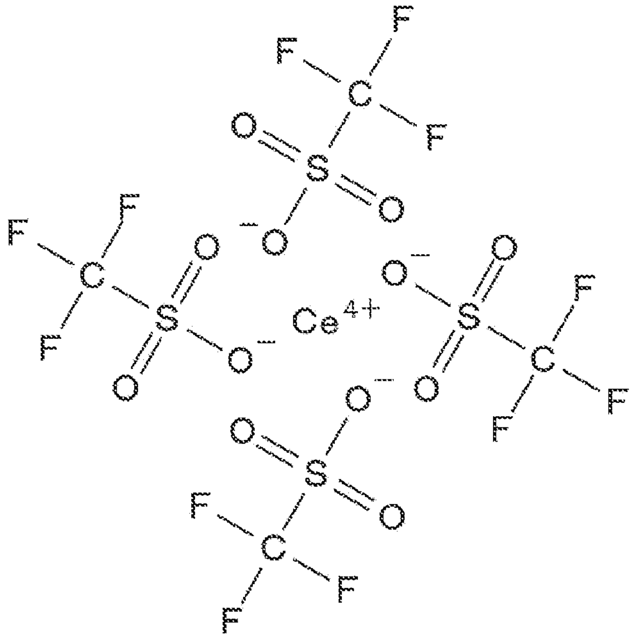
FIG. 11 is a diagram showing a chemical structure of a trifluoromethane-sulfonate used in Comparative Example 2.

In Comparative Example 2, the present inventors used anhydrous Ce(IV) triflate as shown in FIG. 11 as the solute. Anhydrous Ce(IV) triflate is a trifluoromethanesulfonate salt of a tetravalent ion of cerium without water molecules and is represented as anhydrous Ce(IV)TfO.

As in Example 2, the present inventors performed a dopant treatment, sheet resistance measurements before and after the dopant treatment, and sheet resistance measurements for each elapsed time in the durability evaluation test. Then, the present inventors calculated the sheet resistance change rate with respect to the sheet resistance before the dopant treatment. Moreover, the present inventors conducted chemical state analysis of the dopant before and after the durability evaluation test in the same manner as in Example 2.

Comparative Example 3

Figure 12:
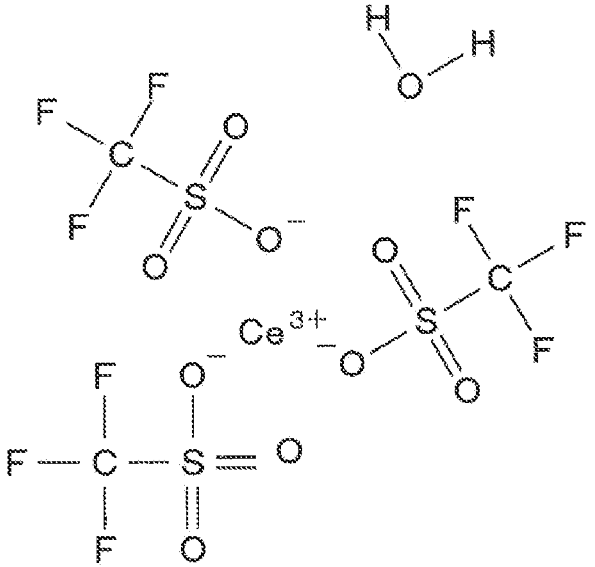
FIG. 12 is a diagram showing a chemical structure of a trifluoromethanesulfonate used in Comparative Example 3.

In Comparative Example 3, the present inventors used, as a solute, a compound whose reagent name is hydrous Ce(III) triflate. Hydrous Ce(III) triflate is a trifluoromethanesulfonate salt of the trivalent ion of cerium containing water molecules, and is represented as hydrous Ce(III)TfO, as shown in FIG. 12. Note that FIG. 12 shows only a trivalent ion as cerium ions.

As in Example 2, the present inventors performed a dopant treatment, sheet resistance measurements before and after the dopant treatment, and sheet resistance measurements for each elapsed time in the durability evaluation test. Then, the present inventors calculated the sheet resistance change rate with respect to the sheet resistance before the dopant treatment. Moreover, the present inventors conducted chemical state analysis of the dopant before and after the durability evaluation test in the same manner as in Example 2.

Figure 13:
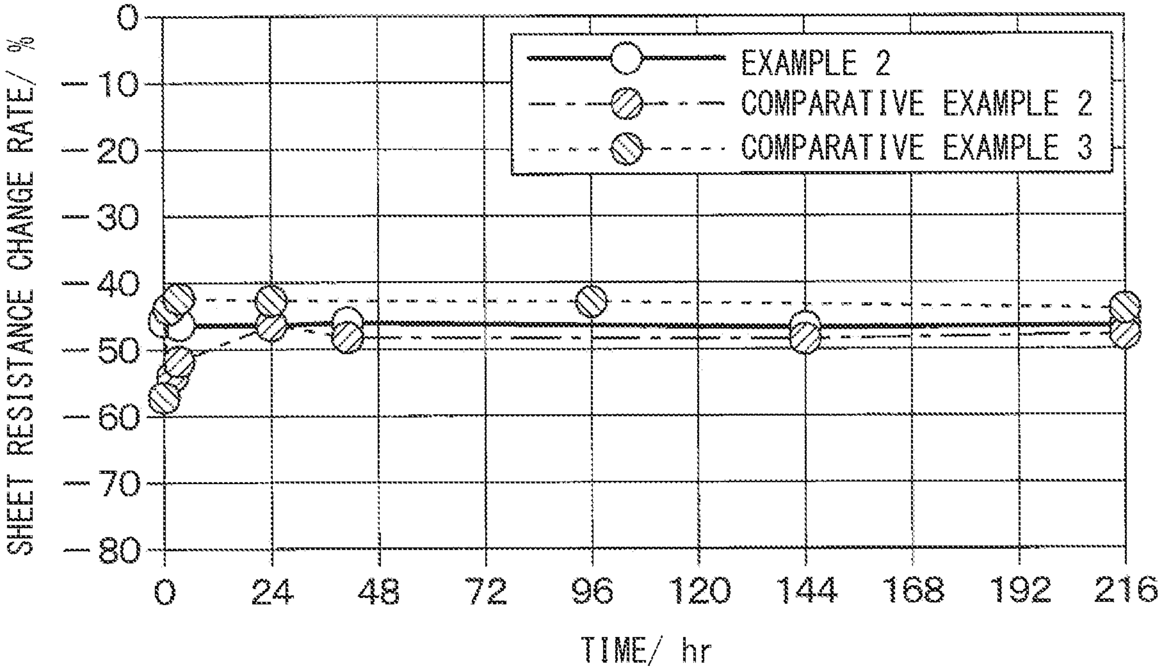
FIG. 13 is a graph showing results of durability evaluation tests of Example 2, Comparative Example 2, and Comparative Example 3.

FIG. 13 shows the results of the durability evaluation test of Example 2, Comparative Example 2 and Comparative Example 3. The vertical axis of the graph in FIG. 13 indicates the sheet resistance change rate with respect to the sheet resistance before the dopant treatment. The horizontal axis of the graph in FIG. 13 indicates the time of exposure to the high-temperature and high-humidity environment. The sheet resistance change rate at time 0 is the sheet resistance change rate after the dopant treatment.

As shown in FIG. 13, in Example 2, the sheet resistance reduction rate at 0 hours is large as in Example 1. Furthermore, the sheet resistance change rate is nearly constant even after the time of exposure to the high-temperature and high-humidity environment has passed. Thus, in Example 2, it was confirmed that the performance was not deteriorated even when exposed to the high-temperature and high-humidity environment.

In both Comparative Examples 2 and 3, the sheet resistance change rate at 0 hours is less than −40%. From these results, it can be seen that the effect of improving conductivity is high. However, in both Comparative Examples 2 and 3, the sheet resistance change rate increased significantly in the initial stage within 24 hours after the start of the durability evaluation test compared to Example 2. The increase in the sheet resistance change rate means that the sheet resistance increased and the conductivity decreased. Thus, in Comparative Examples 2 and 3, performance deterioration occurs in the initial stage.

TABLE 1

| | NAME OF REAGENT | BEFORE DURABILITY EVALUATION | AFTER DURABILITY EVALUATION |
|---|---|---|---|
| EXAMPLE 2 | ANHYDROUS Ce(III)TfO | III | III |
| COMPARATIVE EXAMPLE 2 | ANHYDROUS Ce(IV)TfO | IV | III |
| COMPARATIVE EXAMPLE 3 | HYDROUS Ce(III)TfO | IV >> III | IV > III |

Table 1 shows the results of chemical state analysis of the dopants before and after the durability evaluation test of Example 2, Comparative Example 2 and Comparative Example 3. In the dopant of Comparative Example 2, after the test, the presence ratio of Ce(IV) decreased and the presence ratio of Ce(III) increased compared to before the test.

The name of a reagent used as a dopant in Comparative Example 3 was hydrous Ce(III) triflate. However, there was significantly more Ce(IV) than Ce(III) in the dopant before the test. Therefore, the dopant used in Comparative Example 3 includes a trifluoromethanesulfonate composed of tetravalent ion of cerium and triflate anions more than a trifluoromethanesulfonate composed of a trivalent ion of cerium and triflate anions. In the dopant after the test, the presence ratio of Ce(IV) decreased and the presence ratio of Ce(III) increased compared to before the test. However, even after the test, more Ce(IV) than Ce(III) was present in the dopant.

As described above, both Ce(III) and Ce(IV) function as dopants. However, in terms of redox potential, Ce(III) is more stable than Ce(IV). Therefore, in the dopants of Comparative Examples 2 and 3, Ce(IV) changes to Ce(III) in the initial stage. This is considered to be the cause of the initial deterioration in Comparative Examples 2 and 3.

On the other hand, in the dopant of Example 2, the presence ratio of Ce(III) did not change before and after the test. Therefore, initial deterioration does not occur in the dopant of Example 2. The performance of the dopant is stable even when exposed to the high-temperature and high-humidity environment.

It is generally known that Ce(IV) is more stable than Ce(III) in Ce oxides. However, as described above, in trifluoromethanesulfonates of Ce, Ce(III) is more stable than Ce(IV). Therefore, when using a trifluoromethanesulfonate of Ce as a dopant, it is preferable that Ce is a trivalent ion.

From the results of FIG. 13 and the results of Table 1, it can be seen that it is preferable to use a dopant including a trifluoromethanesulfonate composed of a trivalent ion of cerium and triflate anions more than a trifluoromethanesulfonate composed of a tetravalent ion of cerium and triflate anions. Furthermore, it can be seen that it is more preferable to use the trifluoromethanesulfonate of the trivalent ion of cerium, which does not contain tetravalent ions, as a dopant. In other words, it is more preferable to use the trifluoromethanesulfonate, which is composed of the trivalent ion of cerium and the triflate anions and contains no water molecules, as a dopant.

Example 3

In Example 3, the present inventors prepared three solutions in which the solute and the solvent were same as those in Example 1, and solute concentrations were 1, 5 and 10 mM. Then, the present inventors performed the dopant treatment on specimens in the same manner as in Example 1 using these three kinds of solutions. In addition, the present inventors measured the sheet resistance before and after the dopant treatment. Using these results, the present inventors calculated the sheet resistance change rate with respect to the sheet resistance before the dopant treatment.

Comparative Example 4

In Comparative Example 4, the present inventors prepared three solutions in which the solute was anhydrous K(III) triflate (that is, potassium trifluoromethanesulfonate) and the solute concentrations were 1, 5, and 10 mM. The anhydrous K(III) triflate used is 422843 manufactured by Sigma-Aldrich Co. LLC. Then, the present inventors performed the dopant treatment on specimens in the same manner as in Example 1 using these three kinds of solutions. In addition, the present inventors measured the sheet resistance before and after the dopant treatment. Using these results, the present inventors calculated the sheet resistance change rate with respect to the sheet resistance before the dopant treatment.

Figure 14:
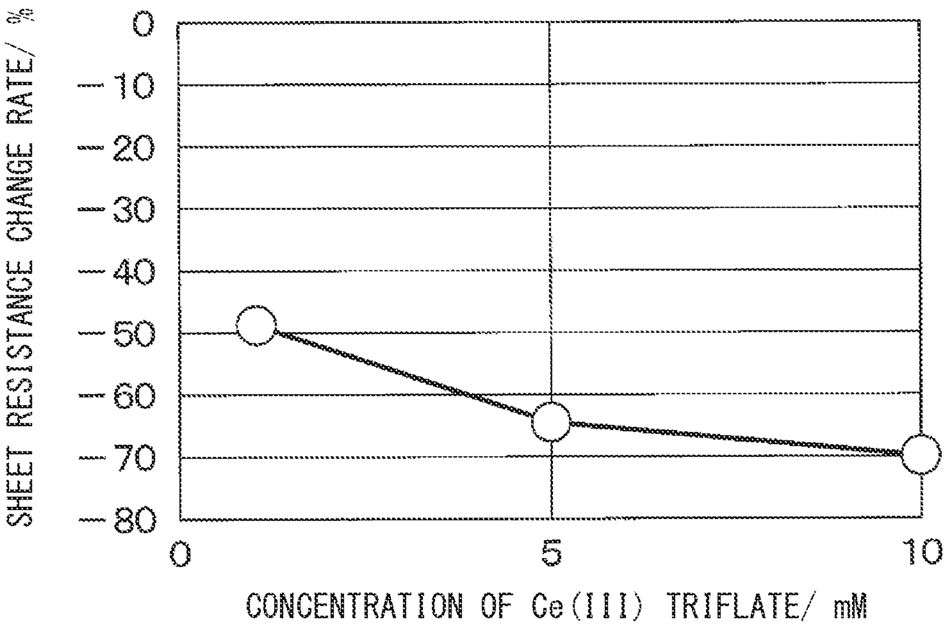
FIG. 14 is a graph showing a relationship between a dopant concentration and a sheet resistance change rate in Example 3.

FIG. 14 shows the results of Example 3. The sheet resistance change rate is less than −40% when the concentration of anhydrous Ce(III) triflate is 1 mM. That is, the reduction rate of the sheet resistance of this specimen is greater than 40%. The sheet resistance change rates are less than −60% when the concentrations of anhydrous Ce(III) triflate are 5 mM and 10 mM. That is, the reduction rates of the sheet resistance of these specimens are both greater than 60%.

Figure 15:
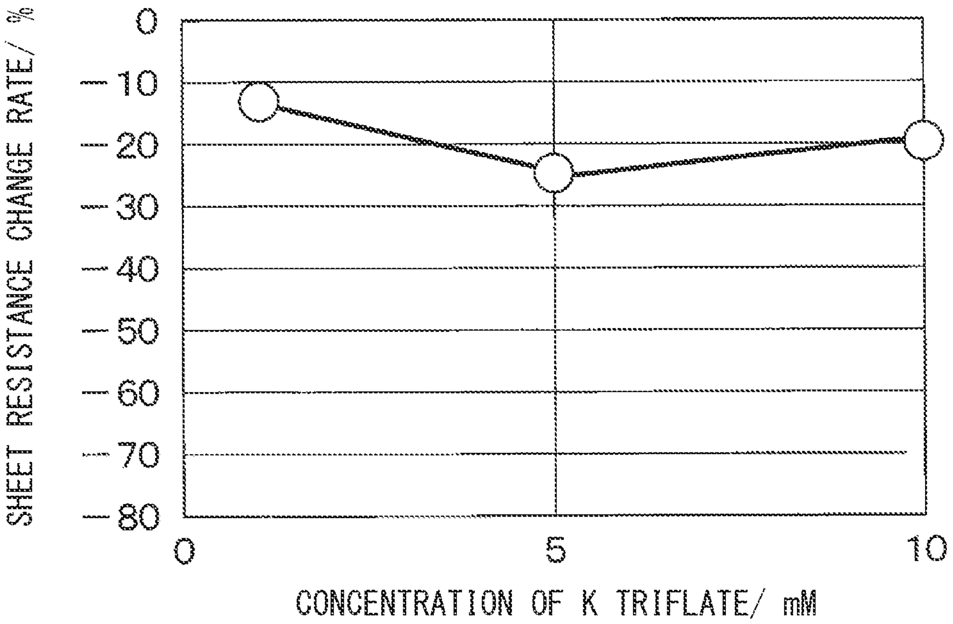
FIG. 15 is a diagram showing a relationship between a dopant concentration and a sheet resistance change rate in Comparative Example 4.

FIG. 15 shows the results of Comparative Example 4. The sheet resistance change rates at concentrations of anhydrous K(III) triflate of 1, 5 and 10 mM are between −10% and −30%. In other words, the reduction rates of the sheet resistance of these specimens are less than 30%.

Thus, it was confirmed that in a case where a cation of the trifluoromethanesulfonate is Ce of a lanthanide, an effect as a dopant is high compared to a case where the cation of the trifluoromethanesulfonate is K of an alkali metal.

What is claimed is:

1. A conductor comprising:

a conductive structure having a predetermined shape and including a carbon material having conductivity; and a dopant that causes the carbon material to generate an electric charge, wherein the dopant includes a trifluoromethanesulfonate that is composed of a trivalent ion of a lanthanide and triflate anions.

2. The conductor according to claim 1, wherein the lanthanide is cerium.

3. The conductor according to claim 1, wherein the trivalent ion of the lanthanide is a trivalent ion of cerium, and the dopant includes the trifluoromethanesulfonate that is composed of the trivalent ion of cerium and the triflate anions more than a trifluoromethanesulfonate that is composed of a tetravalent ion of cerium and triflate anions.

4. The conductor according to claim 1, wherein the lanthanide is cerium and the trifluoromethanesulfonate contains no water molecules.

5. A manufacturing method of a conductor comprising:
preparing a conductive structure having a predetermined shape and including a carbon material having conductivity;
preparing a solution including a solute and a solvent, the solute serving as a dopant that causes the carbon material to generate an electric charge;
attaching the solution to the conductive structure; and
removing the solvent from the conductive structure after attaching the solution to the conductive structure, wherein
the preparing of the solution includes preparing the solute including a trifluoromethanesulfonate that is composed of a trivalent ion of a lanthanide and triflate anions.

6. The manufacturing method according to claim 5, wherein
the lanthanide is cerium.

7. The manufacturing method according to claim 5, wherein
the trivalent ion of the lanthanide is a trivalent ion of cerium, and
the preparing of the solution includes preparing the solute that includes the trifluoromethanesulfonate that is composed of the trivalent ion of cerium and the triflate anions more than a trifluoromethanesulfonate that is composed of a tetravalent ion of cerium and triflate anions.

8. The manufacturing method according to claim 5, wherein
the lanthanide is cerium and the trifluoromethanesulfonate contains no water molecules.

* * * * *